United States Patent [19]

Gruber et al.

[11] Patent Number: 5,450,394

[45] Date of Patent: Sep. 12, 1995

[54] DELAY MONITORING OF TELECOMMUNICATION NETWORKS

[75] Inventors: John G. Gruber, Orleans; Asghar E. Methiwalla, Manotick; Anil Chandan, Nepean, all of Canada

[73] Assignee: Northern Telecom Limited, Montreal, Canada

[21] Appl. No.: 208,325

[22] Filed: Mar. 10, 1994

[51] Int. Cl.⁶ .............................................. H04J 3/14
[52] U.S. Cl. ........................................ 370/17; 375/354
[58] Field of Search ................... 370/17, 13, 60, 94.1, 370/94.2, 60.1, 108; 379/24, 29; 375/106

[56] References Cited

U.S. PATENT DOCUMENTS

| | | | |
|---|---|---|---|
| 4,247,464 | 9/1993 | Curtis | 370/17 |
| 4,800,560 | 1/1989 | Aoki et al. | 370/108 |
| 4,961,188 | 10/1990 | Lau | 370/94.2 |
| 5,130,984 | 7/1992 | Cisneros | 370/94.1 |
| 5,255,291 | 10/1993 | Holden et al. | 370/94.2 |
| 5,260,978 | 11/1993 | Fleischer et al. | 375/106 |
| 5,276,677 | 1/1994 | Ramamurthy et al. | 370/60 |
| 5,313,454 | 5/1994 | Bustini et al. | 370/94.1 |
| 5,381,404 | 1/1995 | Sugano et al. | 370/17 |

FOREIGN PATENT DOCUMENTS

| | | |
|---|---|---|
| 271645 | 6/1988 | Japan . |
| 4123549 | 9/1990 | Japan . |
| 4207435 | 11/1990 | Japan . |

OTHER PUBLICATIONS

Bellcore Technical Advisory TA-NWT-001248, Issue 1, Oct. 1992, "Generic Requirements for Operations of Broadband Switching Systems", pp. 5-12 and 5-13.

*Primary Examiner*—Douglas W. Olms
*Assistant Examiner*—Shick Hom
*Attorney, Agent, or Firm*—Yoshiharu Toyooka

[57] ABSTRACT

Novel techniques are disclosed for continuously monitoring parameters of delay between two nodes in a telecommunication network such as an ATM or frame relay network. The techniques use measurement cells, i.e. test cells, test frames, performance management ATM OAM cells, or performance management frame relay frames. These cells or frames contain a timestamp indicating the time a cell or frame is sent and a delay value indicating a difference between reception and transmission times of the cell or frame. Near-end and far-end as well as unidirectional or bidirectional monitoring can be performed, to support single-ended monitoring.

10 Claims, 2 Drawing Sheets

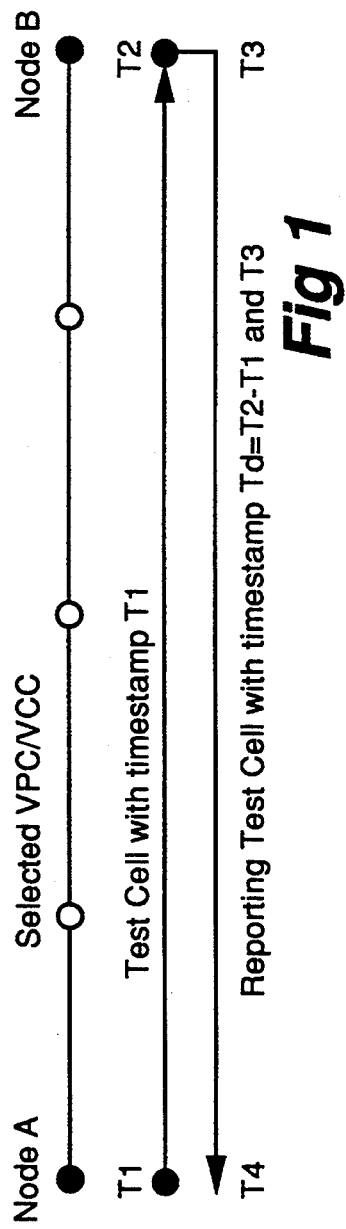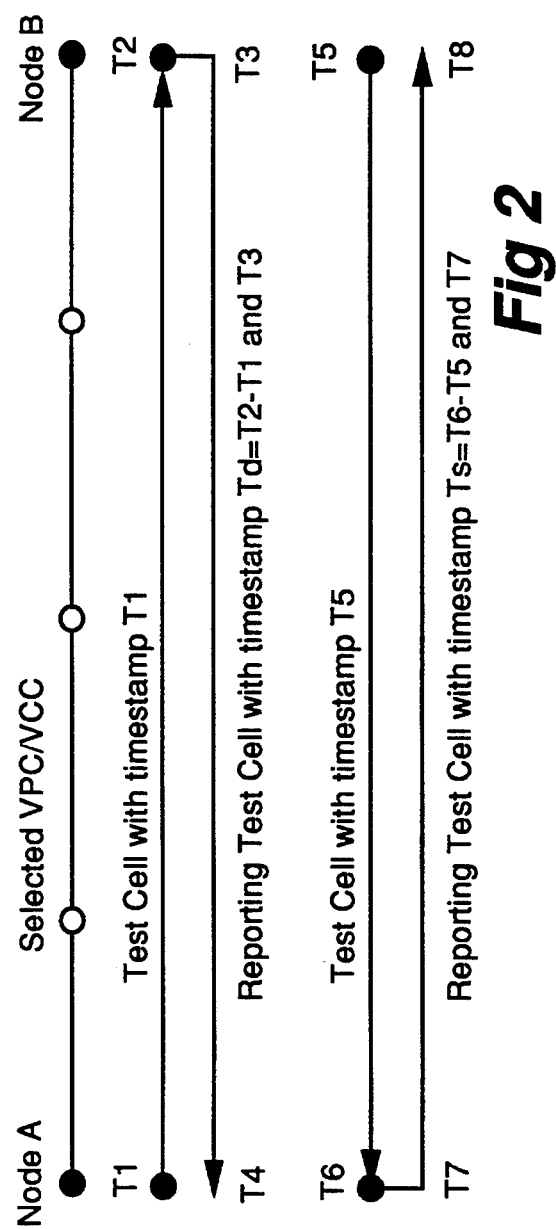

DELAY MONITORING OF TELECOMMUNICATION NETWORKS

FIELD OF THE INVENTION

The present invention relates generally to monitoring performance of a telecommunication network. In particular, it is directed to monitoring of the cell delay between two nodes of a telecommunication network, e.g. ATM networks, frame relay networks etc., using measurement cells, test cells or OAM (Operations, Administration, and Maintenance) cells or, in the case of a frame relay network, test or OAM flames.

BACKGROUND OF THE INVENTION

Telecommunication networks must be properly maintained to ensure that adequate network performance is achieved and that end-user services are supported. Maintenance functions include "performance management" (continuous in-service performance monitoring for proactive warning of performance degradation) and "fault management" (detection and location of network trouble and failure).

Delay monitoring is important in managing performance of ATM networks and the following parameters are used for such purposes because they affect important network management functions.

Cell Transfer Delay (CTD)

Relates to throughput and response time for high speed data services, and is used for:
  provisioning congestion and protocol parameters such as window sizes and time-outs;
  selecting low delay routes (e.g. to avoid satellite links); and
  deploying echo cancellers.

Cell Delay Variation (CDV)

Used for:
  dimensioning AAL-1 buffers for smoothing CBR (continuous bit rate) traffic;
  detecting excessive traffic; and
  predicting congestion.

To support performance and fault management functions of VPC/VCC (virtual path connection/virtual channel connection) in ATM networks, OAM cells are defined to carry operation information such as error checks, node identifiers (IDs), fault descriptions, loopback indications, timestamps, etc. OAM cells are identified in the ATM cell header as separate from user cells.

Bellcore Technical Advisory TA-NWT-001248, Issue 1, October 1992, describes on pages 5-12 and 5-13 how Performance Management OAM cells (PM OAM cells), each containing a timestamp, can be used to obtain an estimate of excessive cell transfer delay occurrences at the broadband switching system that receives the timestamp information in the forward report within the forward monitoring cell. It further states that this count can only be made and stored at the connection/segment end point that receives the forward monitoring cell, because at present there is no field in the PM OAM cell that allows backward reporting of excessive cell transfer delay occurrences. Bellcore goes on to state:

If "the clocks of the BSSs are synchronized in absolute time, . . . the one-way delay can be measured directly with a Performance Management OAM cell. However while the frequencies of the BSSs' clocks will be almost perfectly matched in a BISDN network, the absolute time is not expected to be synchronized. In practice, absolute time differences of several seconds are possible.

Whether the clocks are synchronized or not, there is a lower bound on the delays observed at a receiving node. Delays longer than the minimum would be caused by queuing and processing delays. . . . the parameter of interest is how many delay measurements exceed the maximum allowed value, $L + V_{max}$, where L is the lowest observed value (obtained through calibration). . . .

When the timestamp is being used, it is encoded in the PM OAM cell at the originating end. This time stamp will be accurate to within $\pm 1.0$ $\mu$sec. The terminating end point compares the time stamp to the time shown by its own clock. This comparison needs to be done as soon as OAM processing has begun on the received PM OAM cell, so that the delay measurement includes as little OAM cell processing time as possible. Variation of the delay experienced by the PM OAM cell will provide a good estimate of the delay variation experienced by the user-information cells.

. . . One can estimate the lowest value, L, by a calibration procedure in which the delays of the first C PM cells [C may be e.g. 1000] are observed, and the lowest value is recorded. Note that L may be negative, because the clocks of the two nodes are not necessarily synchronized. The amount by which the observed delay measurements exceed L provides an unbiased estimate of the delay variation."

To summarize, Bellcore states that:

"To measure cell delay variation, the following actions have to be performed:
  the originating mode must encode time stamps,
  the receiving node must calibrate the first C PM cells to calculate L, and
  the receiving node must count the number of PM cells with delays greater than $L + V_{max}$."

Monitoring can be performed at different locations in a network and the following are examples:

a) Near-End monitoring which provides performance of a received signal from its origination to its termination. Bit Interleaved Parity (BIP) is used for ATM by forward monitoring OAM cells. The monitoring point is at the received signal termination.

b) Far-End monitoring provides performance of a transmitted signal from its origination to its termination. For ATM, performance at the far-end termination is sent back to the monitoring point in received signal overhead, e.g. backward reporting OAM cells. The monitoring point is at the received signal termination where the overhead is read.

c) Intermediate monitoring is at intermediate locations in a transparent mode such that near- and far-end performance indicators are read but not terminated. This provides performance of the received signal from its origination to the intermediate monitoring point (e.g. by calculating BIP in forward monitoring OAM cells), and performance of a transmitted signal from its origination to its termination (e.g. by reading backward reporting OAM cells at the intermediate monitoring point).

As seen in the above description, the technique described by Bellcore only provides near-end monitoring, and for one parameter only. The present invention provides near-end and/or far-end monitoring of a number of delay parameters of a telecommunication network such as an ATM or frame relay network.

The present invention can therefore support single-ended monitoring, that is to say, it can monitor performance in both directions from one end. The present invention can further support single-ended monitoring from each node so that both nodes can obtain results of their far-end as well as near-end monitoring.

OBJECTS OF THE INVENTION

It is therefore an object of the present invention to provide a method of monitoring performance of a telecommunication network such as an ATM or frame relay network.

It is another object of the present invention to provide a method of monitoring delay parameters of a telecommunication network such as an ATM or frame relay network.

It is a further object of the present invention to provide a method of near-end monitoring of delay parameters of a telecommunication network such as an ATM network using measurement cells.

It is yet a further object of the present invention to provide a method of near-end and far-end monitoring of delay parameters of a telecommunication network such as an ATM network using measurement cells.

It is still another object of the present invention to provide a method of near-end and far-end monitoring of delay parameters of a telecommunication network such as an ATM network using measurement cells to support single-ended monitoring.

It is still a further object of the present invention to provide a method of near-end and far-end monitoring of delay parameters of a telecommunication network such as an ATM network using measurement cells to support single-ended monitoring at both ends.

SUMMARY OF THE INVENTION

Briefly stated, the present invention is directed to a method of measuring delay parameters between nodes A and B in a telecommunication network, each node having a clock. The method comprises steps of node A sending to node B a measurement containing timestamp value T1 indicating the time the measurement cell is sent according to the clock at node A, and node B, in response to the measurement cell, sending to node A a reporting measurement cell containing timestamp value T3 and a delay difference value Td, wherein Td=T2−T1, and T2 and T3 are respectively the times the measurement cell is received at node B and the reporting measurement cell is sent from node B according to the clock at node B. The method further includes steps of node A receiving the reporting measurement cell at time T4, according to the clock at node A, and obtaining delay parameters using T1, T3, T4 and Td.

BRIEF DESCRIPTION OF THE DRAWINGS

For a more complete understanding of the present invention and for further objects and advantages thereof, reference may now be made to the following description, taken in conjunction with the accompanying drawings, in which:

FIG. 1 is a schematic illustration of a basic concept of the present invention;

FIG. 2 is a schematic illustration of the present invention according to another embodiment.

DETAILED DESCRIPTION OF PREFERRED EMBODIMENTS

Figure 3:
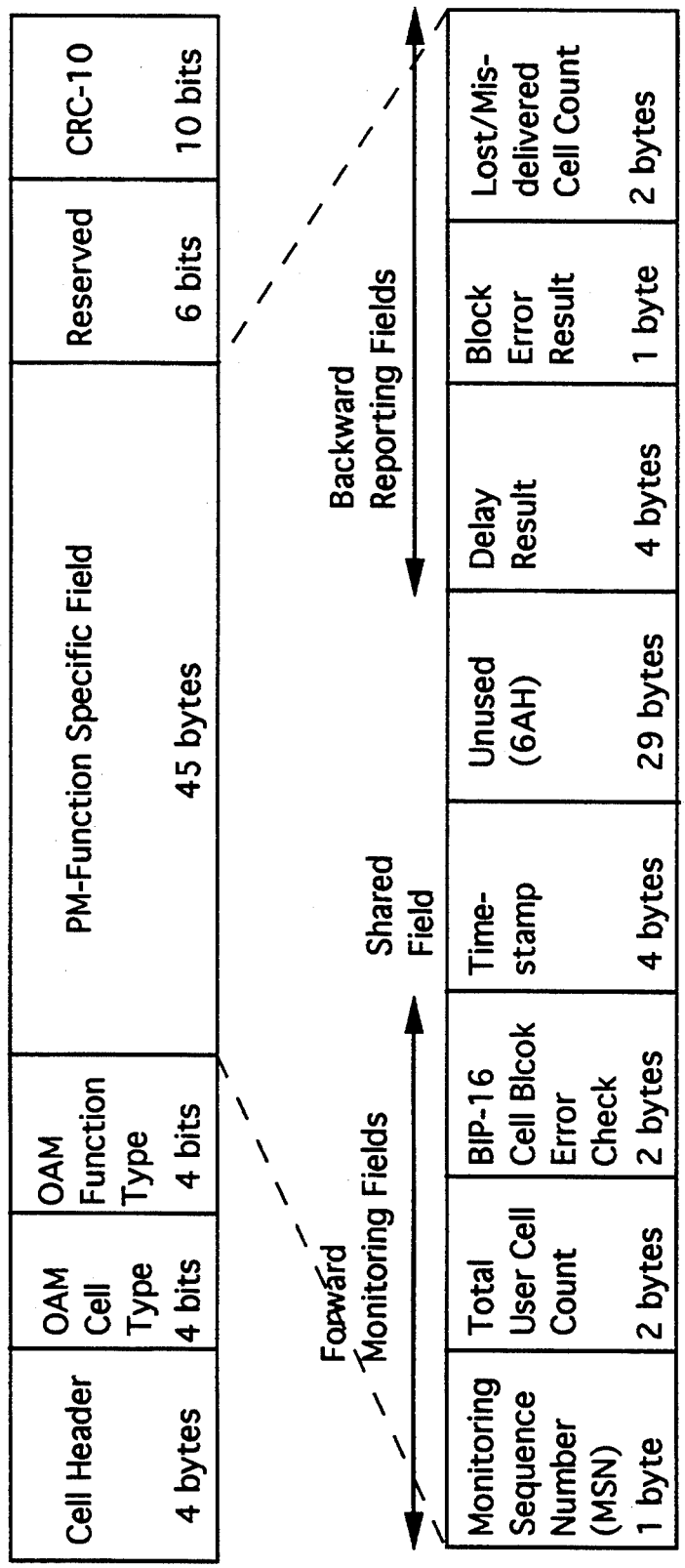
FIG. 3 shows a PM OAM cell format.

FIG. 1 depicts schematically the basic concept of near-end and far-end performance monitoring of an ATM network at node A. Near-end and far-end monitoring can be performed independently, however, for convenience the figure shows both. According to one embodiment of the present invention, when monitoring of both near- and far-end is performed, single-ended monitoring is possible at node A. In the figure, the following designations are employed:

—T1 is the timestamp value indicating when a measurement cell is sent from A, according to A's clock;

—T2 is the time the measurement cell is received at B, according to B's clock;

T3 is the timestamp value indicating when a reporting measurement cell is sent from B, according to B's clock; and T4 is the time the reporting measurement cell is received at A, according to A's clock.

It should be noted that the measurement cell and reporting measurement cell described above can be any specialized cells, they can be test cells, or PM OAM cells. OAM cells are defined in ATM standards and are used for in-service monitoring. The test cells, on the other hand, are used for out-of-service measurements. It is to be understood, therefore, that measurement cells, test cells and OAM cells are interchangeably used throughout this application. OAM cells will be described in more detail below with respect to a different embodiment of the present invention. In frame relay networks, on the other hand, test or OAM frames can be used.

Delays can be expressed as follows:

$Td = T2 - T1 =$ transfer delay + variable delay + TOD error, at B, for A to B direction; and $Ts = T4 - T3 =$ transfer delay + variable delay + TOD error, at A, for B to A direction.

In the above equations, the TOD (Time of Day) error is a discrepancy between individual clocks at A and B and equal in value in each direction; it is considered constant during the period of delay test. The transfer delay is system specific and includes propagation and processing delays. Transfer delay is also considered constant in each direction during the period of delay test. The variable delays are not necessarily equal in each direction. A change in Td or Ts is called cell delay variation (CDV). It should be noted that in unidirectional monitoring (single-ended monitoring at one node), the test is initiated at node A when node A sends a forward monitoring cell or frame to node B and node B responds by sending to node A a backward reporting cell or frame. Full test results are available only at node A. In bidirectional monitoring (single-ended monitoring at both nodes), the test is also initiated at node A but node B not only responds to node A but sends its own forward monitoring cell or frame to node A, thus enabling node A to respond to node B. Full test results are available at both nodes A and B. In one embodiment, node B's backward reporting cell or frame doubles up as its own forward monitoring cell or frame. Referring to FIG. 1 again, the algorithmic process of the present invention is explained as follows:

Node A sends to node B a measurement cell with timestamp T1;

Node B receives the measurement cell and calculates T2−T1 to obtain the delay difference information Td in the direction from A to B $$Td = T2 - T1; \quad (1)$$

Node B sends to node A a reporting measurement cell containing timestamp T3 and delay difference information Td;

Node A receives the reporting measurement cell at T4.

Thus Node A has in its possession values T1, T3, T4 and Td and will be able to obtain various delay parameters using these values.

Delay difference Ts in the direction from B to A is $$Ts = (T4 - T3) \quad (2)$$

and therefore Round Trip Delay (RTD) can be determined as the sum of the delay differences $$RTD = (T4 - T3) + (T2 - T1) = Ts + Td. \quad (3)$$

Equation (3) can be rearranged as below:

$$RTD = (T4 - T1) - (T3 - T2). \quad (4)$$

Equation (4) thus indicates that RTD is the total round trip delay (T4−T1) less (T3−T2) which includes the cell processing delay and other miscellaneous delays of equipment at node B. From RTD, the cell transfer delay (CTD) in one direction can be estimated as $$\text{Estimated } CTD = RTD/2. \quad (5)$$

If Time of Day (TOD) distribution among network nodes were accurate, or in other words, if the clocks at the nodes were perfectly synchronized in absolute time, the TOD error in Equations (1) and (2) would be zero. However, in practice, the TOD error can be of the order of a few seconds, so that direct monitoring of one-way transfer delay using timestamps in Equations (1) and (2) is impractical. However, it should be noted that even if the clocks at the nodes are not synchronized, Equations (3) and (4) are always true for RTD measurement because the TOD error in the direction from A to B in equation (1) will cancel out with the TOD error in another direction from B to A in equation (2). The TOD error is expected to be constant during the period of delay test and can therefore be eliminated by subtracting a fixed delay, such as the minimum of all Td=(T2−T1) samples, from each of the individual Td samples to obtain samples of delay variation. A similar subtraction can be performed in the opposite direction. These subtractions also eliminate the unknown minimum system transfer delay in each direction.

Therefore, Td and Ts in equations (1) and (2) can be replaced by:

Estimated $CDV = Td\text{-min.}(T2-T1)$, at $B$, for $A$ to $B$ direction; (5)

Estimated $CDV = Ts\text{-min.}(T4-T3)$, at $A$, for $B$ to $A$ direction. (6)

It should be noted that the cell processing time of node B requires a separate calculation of T3−T2 because node B does not send T2 to node A. In other words, node A has T1, T3, T4 and Td at its disposal. Furthermore, within reasonable limits, T3 and Td can be sent at an arbitrary time from B to A, thereby disguising the true processing time at node B.

Various other delay parameters can be obtained at node A.

Estimated Maximum Cell Transfer Delay (MCTD)

Estimated $CTD = RTD/2 = (T4-T1)-(T3-T2)$. Averaging samples of CTD provides the mean one-way delay, but for certain circumstances it is more useful to monitor the maximum CTD. Thus:

Estimated Max. $CTD = $ Max. $RTD/2 = $ Max. $[(T4-T1)-(T3-T2)]/2$ (7)

This is a reasonable estimate of maximum CTD, since physical routing of ATM connections is the same in each direction, that is to say, propagation and nominal processing delays are similar in each direction, although CDV may differ. In equation (7) Max. RTD is the maximum value among RTD samples obtained by equation (3) or (4).

Cell Delay Variation (CDV)

CDV is with respect to a reference delay which is, for example, the first delay sample or calibrated minimum delay sample. However, the present invention uses the most recent minimum delay difference information as the reference for determining CDV because it is simpler in processing (no calibration needed) and operationally more useful due to the fact that all CDV values are now positive. Thus, for each direction, CDV is the delay difference in that direction less the most recent minimum delay difference in that direction. Therefore, in place of equations (5) and (6), CDV can be expressed as follows:

$CDV$ from $A$ to $B = Td$—most recent minimum $Td$ (8)

$CDV$ from $B$ to $A = Ts$—most recent minimum $Ts$. (9)

Excessive Cell Delay Variation

Excessive CDV is an instance where CDV exceeds a maximum limit, with default limits to be determined. The limits should eventually be limited to a small number of values (2 or 3), but should be settable until the most appropriate values are determined. The expected maximum CDV range is of the order of 1 ms for CBR (constant bit rate) traffic but may be more for VBR (variable bit rate) traffic.

Advantages of this single ended monitoring approach of the present invention are:

neither a Time of Day (TOD) clock (i.e., hour, min., sec., etc.), nor TOD coordination among nodes is required. The TOD error among nodes cancels;

the processing time spent at a particular node can be disguised (within reasonable limits) by sending the far-end timestamp and delay difference at an arbitrary time; and times T1, T2 and T3 don't need to be stored in the equipment at nodes while the delay measurement is underway. They are effectively stored in the test or OAM cells.

In another embodiment, FIG. 2 illustrates the bidirectional monitoring setup wherein the mirror image of FIG. 1 includes unidirectional monitoring in the opposite direction. Thus in FIG. 2, after unidirectional monitoring is initiated at node A, node B sends a measurement cell with timestamp T5 and node A sends a reporting measurement cell with timestamp T7 and value Ts which in this case is (T6−T5). Node B receives the reporting measurement cell at T8. From FIGS. 1 and 2, each node will have full test results at their disposal and can determine delay parameters such as estimated max. CTD and excessive CDV to each direction. Excessive CDV events counted during 15 min. intervals are accumulated directly over 1 day intervals. In yet another embodiment, the reporting measurement cell which node B sends to node A can also be used as the measurement cell in the opposite direction. In this case, T5 and T6 would be T3 and T4 respectively.

While a measurement cell containing a timestamp has thus far been described, different embodiments use test or PM OAM cells which have fields suitable for the purpose of delay monitoring.

The main performance management functions included in the OAM cell format are shown in FIG. 3.

Forward Monitoring Fields

OAM cell sequence number: (1 byte), detects lost/-misinserted OAM cells, which affect the validity of performance monitoring results.

Total User-cell Count (TUC): in cells (2 bytes). The running total of user cell payloads over which error checking has been performed. This technique (as opposed to a simple cell block count), enables the number of lost user cells to be determined when OAM cells are lost.

Error Check Code: BIP-16 (2 bytes), for error detection on a block of user cell payloads.

Backward Reporting Fields

Lost or misinserted cell count: based on TUC (2 bytes). The number of received user cells over which the current error check should be performed, is the difference between the current and previous TUC. If the actual count of user cells is lower, cells have been lost; if higher, cells have been misinserted.

Block Error Result: based on BIP-16 error check (1 byte).

Delay Result: (4 bytes). Used to report delay difference information, e.g., Td=T2−T1 in FIG. 1.

Shared Fields

Timestamp: (4 bytes), can be used to monitor cell delay variation which relates to congestion, and is useful as a trigger for engineering additional traffic capacity. This field is shared because it is used for both forward monitoring and backward reporting. Currently, there is no explicit backward reporting field specified for far-end delay variation. However, this field could be used for this purpose, and with the use of the delay result field could provide a far-end monitoring of cell delay variation in both directions.

Delay Accuracy Considerations

As seen in FIG. 3, four byte fields in test cells or PM OAM cells can each be coded as an integer number of clock periods with a range of from 0 to $2^{32}-1$ periods. Each period represents a 10 ns unit of time; e.g., a delay of 50 $\mu$s would appear as 50/0.01=5000 (10 ns) units. Delay is monitored to an accuracy of ±1 $\mu$s. Thus a clock frequency of 1 MHz or more can be used; e.g., each period of a 20 MHz clock represents 1/(20*0.01)=5 (10 ns) units. To achieve this accuracy, TOD coordination is not required since, as noted earlier, the TOD error between nodes cancels. However, clocks with sufficient short term stability are required as discussed below.

For CTD, the error in $\mu$s due to clock instability is CTDe=$10^6 \delta$ T, where $\delta$ is the relative short term clock stability, and in this case T=CTD is the time in sec. of the delay measurement. Assuming a worst case CTD of 1 sec., then to achieve an error CTDe within ±1 $\mu$s, $\delta$ must be within $10^{-6}$, or 1 PPM.

Similarly, for CDV, the error in $\mu$s is CDVe=106 $\delta$ T. In this case T is the maximum time between the current delay difference and the most recent minimum delay difference. CDV is monitored over 15 min. intervals. Assuming an unlikely worst case T of 15 min. (900 sec.), to achieve an error CDVe within ±1 $\mu$s, $\delta$ must be within about $10^{-9}$, or 0.001 PPM.

The parameters can be readily determined with stable clocks inherent in network elements (NEs) which, for SONET and switching equipment, are slaved to the synchronization network ($\delta$ within $10^{-11}$). This applies to clocks in public network NEs, as well as clocks in CPEs which would either be loop-timed to public networks, or slaved to private synchronization networks. It is expected that external test set clocks can either have sufficient short term stability, or can be timed externally from a stable synchronization network clock.

Delay Monitoring Implementation Considerations

Out-of-Service Approach: Test cells would be inserted and extracted at test ports. Test cells could be specialized cells with out-of-service test equipment. For delay monitoring, test cells would have a 4 byte timestamp field to carry T1 forward, and the same field could be used to carry T3 backward. In addition, there would be an additional 4 byte field to carry the delay difference Td=(T2−T1) backward. These fields would be similar in principle to the delay monitoring related fields in the PM OAM cell in FIG. 3.

In-Service Approach: This approach would use the PM OAM cell. At present, the optional 4 byte timestamp field in PM OAM cells is defined for monitoring cells (and for monitoring+reporting cells), and can be used to carry T1 forward. At present, this timestamp field is unused for reporting cells, but could be used to carry T3 backward. As in FIG. 3, an additional optional 4 byte "delay result" field could be defined to carry the delay difference Td=(T2−T1) backward.

Ignored or missing user cells have no bearing on the integrity of delay monitoring as long as a sufficiently large number of samples are reported to reliably determine CTD and CDV.

What is claimed is:

1. In a telecommunication network, a method of measuring delay parameters between nodes A and B, each having a clock, comprising steps of:

node A sending to node B a measurement cell containing timestamp value T1 indicating the time the measurement cell is sent, according to the clock at node A;

node B, in response to the measurement cell, sending to node A a reporting measurement cell containing timestamp value T3 and a delay difference value Td, wherein Td=T2−T1, and T2 and T3 are respectively the times the measurement cell is received at node B and the reporting measurement cell is sent from node B according to the clock at node B;

node A receiving the reporting measurement cell at time T4, according to the clock at node A, and obtaining a cell delay variation CDV in the direction from node A to node B as one of the delay parameters by using the following equation:

$$CDV = Td\text{-most recent minimum } Td.$$

2. The method according to claim 1, wherein one of the delay parameters is a round trip delay RTD, the method further comprising a step of node A calculating the RTD by the following equation:

$$RTD = Td + Ts$$

wherein $Ts = T4 - T3$.

3. The method according to claim 2, wherein other delay parameters are an estimated cell transfer delay CTD and a maximum estimated cell transfer delay MCTD, the method further comprising a step of node A obtaining the parameters by the following equations:

$$CTD = RTD/2, \text{ and}$$

$$MCTD = Max. \ RTD/2.$$

4. The method according to claim 3 wherein the measurement cell and the reporting measurement cell are test cells or performance management OAM cells defined for forward monitoring and backward reporting in the ATM standard, each measurement cell containing a timestamp field and each reporting measurement cell containing a timestamp field and a delay result field.

5. The method according to claim 3 wherein the telecommunication network is a frame relay network and the measurement cell and reporting measurement cell are a measurement frame and a reporting measurement frame respectively, each measurement frame containing a timestamp field and each reporting measurement frame containing a timestamp field and a delay result field.

6. In a telecommunication network, a method of measuring delay parameters between nodes A and B, each having a clock, according to claim 1, wherein the step of:
    node B sending to node A a reporting measurement cell containing timestamp value T3 and a delay difference value Td is performed at an arbitrary time after reception of the measuring cell from node A.

7. In a telecommunication network, a method of measuring delay parameters between nodes A and B, each having a clock, according to claim 1 further comprising steps of:
    node B sending to node A a separate measurement cell containing timestamp value T5 indicating the time the separate measurement cell is sent, according to the clock at node B;
    node A, in response to the separate measurement cell, sending to node B a separate reporting measurement cell containing timestamp value T7 and a delay difference value Ts1, wherein $Ts1 = T6 - T5$, and T6 and T7 are respectively the times the separate measurement cell is received at node A and the separate reporting measurement cell is sent from node A according to the clock at node A; and
    node B receiving the separate reporting measurement cell at time T8, according to the clock at node B, and obtaining a cell delay variation CDV in the direction from node B to node A as one of the delay parameters by using the following equation:

$$CDV = Ts1\text{-most recent minimum } Ts1.$$

8. The method according to claim 7, wherein:
    the steps of node B sending to node A the reporting measurement cell and the separate measurement cell are performed in one step by combining said reporting measurement cell and separate measurement cell into a same cell, resulting in $T5 = T3$, and therefore $T6 = T4$.

9. The method according to claim 2 wherein the measurement cell and the reporting measurement cell are test cells or performance management OAM cells defined for forward monitoring and backward reporting in the ATM standard, each measurement cell containing a timestamp field and each reporting measurement cell containing a timestamp field and a delay result field.

10. The method according to claim 2 wherein the telecommunication network is a frame relay network and the measurement cell and reporting measurement cell are a measurement frame and a reporting measurement frame respectively, each measurement frame containing a timestamp field and each reporting measurement frame containing a timestamp field and a delay result field.

* * * * *